United States Patent [19]

Müssiger

[11] 4,403,425
[45] Sep. 13, 1983

[54] APPARATUS FOR DRYING AND SMOOTHING ARTICLES OF CLOTHING

[75] Inventor: Klaus Müssiger, Bad Salzuflen, Fed. Rep. of Germany

[73] Assignee: Herbert Kannegiesser GmbH & Co., Vlotho, Fed. Rep. of Germany

[21] Appl. No.: 278,157

[22] Filed: Jun. 29, 1981

Related U.S. Application Data

[63] Continuation of Ser. No. 49,831, Jun. 18, 1979, abandoned.

[30] Foreign Application Priority Data

Jun. 22, 1978 [DE] Fed. Rep. of Germany ....... 2827433

[51] Int. Cl.³ .............................................. B08B 3/02
[52] U.S. Cl. .......................................... 34/162; 34/60; 34/242; 68/5 C; 414/155
[58] Field of Search ..................... 34/60, 68, 151, 162, 34/163, 236, 242; 68/3 R, 5 C; 414/150, 155

[56] References Cited

U.S. PATENT DOCUMENTS

| 2,732,701 | 1/1956 | Smith et al. .............................. 68/20 |
| 3,644,085 | 2/1972 | Beeley et al. ...................... 68/5 C X |
| 4,070,876 | 1/1978 | Thompson et al. .............. 68/5 C X |

FOREIGN PATENT DOCUMENTS 2100116 1/1972 Fed. Rep. of Germany .

Primary Examiner—Albert J. Makay
Assistant Examiner—Harold Joyce
Attorney, Agent, or Firm—Sughrue, Mion, Zinn, Macpeak and Seas

[57] ABSTRACT

Washed articles of clothing 10 on hangers 27 are conveyed into a tunnel 11 having a hot air supply 20 followed by a steaming zone 12 followed by a drying and smoothing zone 13 through a narrow entrance opening 16 of a non-treating chamber 14 in an attitude parallel to their direction of conveyance (arrow 24). They are thereafter transferred to a conveyor 22 and proceed through the tunnel in an attitude transverse to their direction of conveyance (arrow 25), and finally exit through a narrow opening 19 in a parallel attitude. The narrow entrance and exit openings contain the steam, hot air and noise within the tunnel and conserve energy.

1 Claim, 2 Drawing Figures

APPARATUS FOR DRYING AND SMOOTHING ARTICLES OF CLOTHING

This is a continuation of application Ser. No. 49,831, now abandoned, filed June 18, 1979.

BACKGROUND OF THE INVENTION

This invention relates to an apparatus for the simultaneous drying and smoothing of washed articles of clothing, having a treating chamber in the form of a tunnel and a transport apparatus which conveys the articles of clothing hanging on clothes hangers through the tunnel in a lateral or transverse attitude.

In a well known apparatus of this type (U.S. Pat. No. 3,257,739), the tunnel-like treating chamber has entrance and discharge openings which are formed in such a manner that the articles of clothing, for example, dresses and shirts, can be conveyed therethrough with their front or back side forward, i.e., in the lateral attitude position. The entrance and exit openings of the tunnel are thereby relatively large. The large entrance and exit openings particularly result in the fact that a substantial amount of steam, hot air and sound leaves the tunnel and travels into the room where the apparatus is set up and there have a particularly negative influence on the working conditions of the servicing personnel.

In another known apparatus (DTOS 2,100,116 and 2,166,328) tunnel, which forms an angle, the position of the articles of clothing is changed relative to the conveyance direction of the transport device in the course of the conveyance thereof through the tunnel. The articles of clothing are transported through the steam zone of the tunnel first in the longitudinal attitude or position i.e. with one of their narrow sides forward, and then in the lateral position, passing through the drying zone thereof only in the lateral position. The articles of clothing are fed into the tunnel in the longitudinal position and leave same, after completion of the treatment, in the same position. The entrance and exit openings of the tunnel are thus substantially smaller than those in the other known apparatus having a feed and discharge of the articles of clothing in the lateral position. The particular disadvantage of this apparatus, however, is that the articles of clothing are steamed directly after their passage through the entrance opening of the tunnel by means of steam jet devices. Thus, in this device steam and sound escape to an undesirable degree through the entrance opening into the room in which the apparatus is set up. The relationships on the exit side of the tunnel are similar.

Thus, the disadvantages with the known apparatuses are that a substantial amount of steam, hot air and sound escape through the entrance and exit openings of the tunnel into the room where the apparatus is set up which have a negative effect on the working conditions of the servicing personnel, particularly when the articles of clothing are conveyed through the entrance and exit openings in a lateral position. In addition, the effectiveness of these apparatuses is negatively influenced as a result of the loss of energy.

SUMMARY OF THE INVENTION

The basic objective of the invention is to form an apparatus of the above-mentioned type in such a manner that a substantially lower amount of steam, hot air and sound are lost into the room where the apparatus is set up, especially on the feeding side of the apparatus, so that the working conditions of the servicing personnel are not inhibited and the degree of effectiveness of the apparatus is improved.

In the apparatus according to the invention, the entrance side of a non-treating chamber has entrance and exit openings arranged at an angle to each other, whereby it is possible to convey the articles of clothing first in the longitudinal position into a chamber of the apparatus that is largely free of steam, and then to convey them in a lateral position to the treating chamber or tunnel. Further, with the arrangement of a hot air channel on the entrance side of the tunnel, the discharge of energy (steam and hot air) from the tunnel is decreased, thereby further improving the degree of effectiveness of the apparatus.

By means of a non-treating chamber on the exit side of the tunnel having entrance and exit openings arranged at an angle to each other, servicing personnel can work under as favorable conditions on this side of the apparatus as on the entrance side thereof.

DETAILED DESCRIPTION OF THE PREFERRED EMBODIMENT

Figure 1:
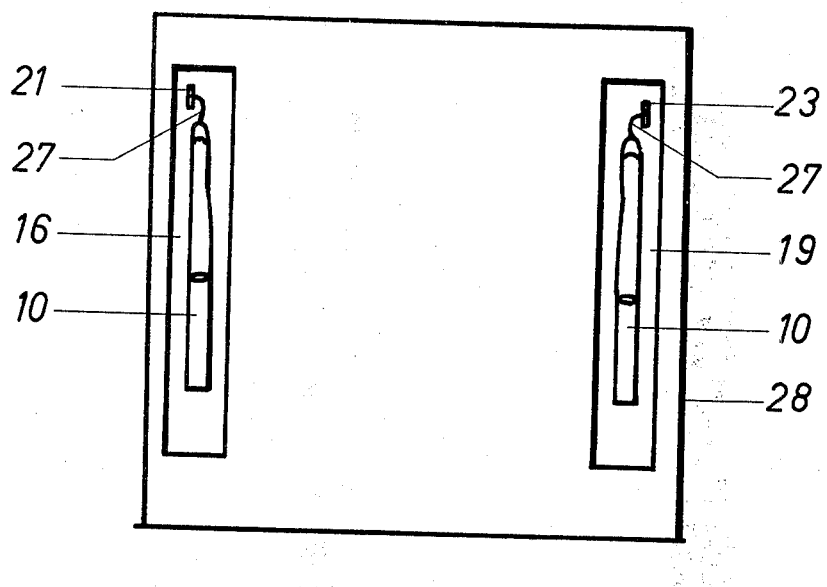
FIG. 1 shows a front view of the apparatus.
Figure 2:
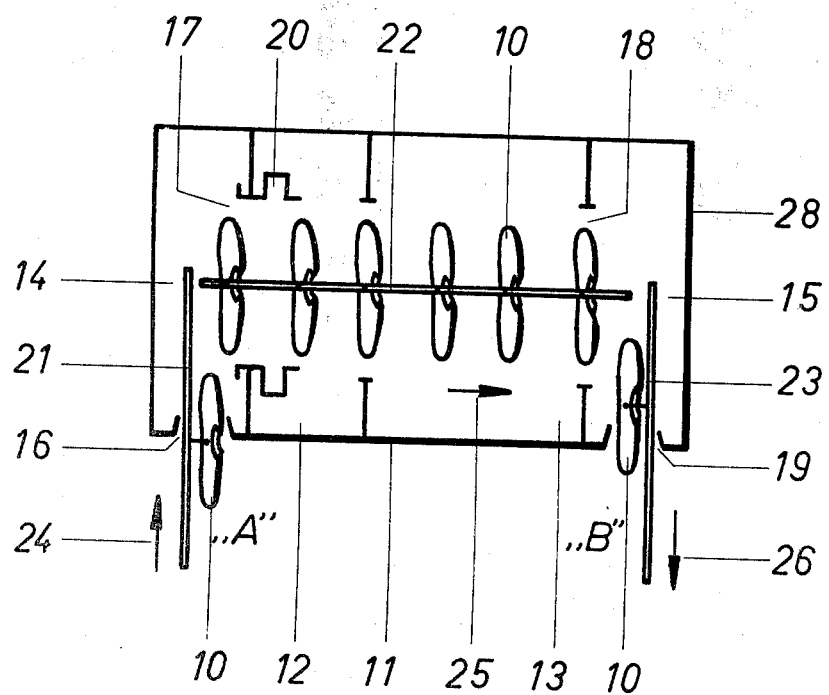
FIG. 2 shows a top or plan view of the apparatus without its upper ceiling cover.

The apparatus illustrated in the drawing basically consists of a treating chamber in the form of a tunnel 11 and non-treating chambers 14,15 having entrance and exit openings 16 through 19. The tunnel 11 has a steam zone 12 and a drying zone 13. At the beginning of the steam zone 12 a hot air channel 20 is arranged. Transport devices 21 through 23 are provided for the conveyance of the articles of clothing 10 hanging on clothes hangers 27 through the non-treating chambers 14,15 and the tunnel 11. The articles of clothing 10 are conveyed by the transport devices 21 through 23 in the direction of arrows 24, 25 and 26 through the non-treating chambers 14,15 and the tunnel 11. The transport devices can be formed in a known manner, for example, as circular or worm conveyors.

The treating chamber is enclosed in a housing 28. In addition, all other devices and elements necessary for operating the apparatus (not shown) are arranged in the housing 28, such as ventilators and heat exchangers.

The manner of operation of the apparatus is as follows.

An attendant or operator at the loading station "A" hangs the clothes hangers 27 carrying the articles of clothing 10 on the transport device 21, which conveys them successively in the direction of arrow 24 through the entrance opening 16 into the non-treating chamber 14 to a point where they hang centrally in front of the transport device 22. The transition of the articles of clothing 10 from the transport device 21 onto the transport device 22 takes place in a known manner. The transport device 22 conveys the articles of clothing 10 in a lateral attitude or position first through the outlet opening 17 of the non-treating chamber 14 and the hot air channel 20 of the tunnel 11 and then through the steam zone 12 and the drying zone 13 thereof. The articles of clothing are steamed in the steam zone 12 by means of steam which is introduced therein through pipelines and nozzles not shown in the drawing. The steam introduced into the steam zone, together with the air swath which forms therein, is sucked out at the ceiling of the tunnel 11 and partially lead through a distribution system of the hot air channel 20, not shown, to form the hot air veil. The articles of clothing are dried and smoothed in the drying zone 13 by hot air. The hot air is led into the drying zone through openings in the ceiling and the side walls of the tunnel 11 and is led out thereof through corresponding openings in the floor. The openings for the introduction and discharge of the hot air are also not shown in the drawings. The dried and smoothed articles of clothing 10 are conveyed by the transport device 22 through the entrance opening 18 into the non-treating chamber 15 and are therein transferred to the transport device 23, which conveys the treated articles of clothing longitudinally in the direction or arrow 26 through the exit opening 19 of the chamber 15 to the removal station "B".

Although the apparatus is only shown schematically in the drawing, it is clear that by means of the invention, it is possible to manufacture a very compact apparatus which has the advantages of the known longitudinal and lateral transport of the articles of clothing 10, but not the disadvantages thereof. By means of the longitudinal entrance and exit of the articles of clothing 10 and the arrangement of the non-treating chambers 14,15 with the small entrance and exit openings 16, 19 toward the room in which the apparatus is set up, practically all impairment to the working conditions of the servicing personnel through steam, hot air and sound is avoided. The lateral transport of the articles of clothing through the tunnel 11 assures an optimal treatment thereof.

What is claimed is:

1. An apparatus for the simultaneous drying and smoothing of washed articles of clothing (10), having a treatment chamber in the shape of a tunnel, the articles of clothing being conveyed therethrough, and a transport device for conveying the articles of clothing, which are suspended on hangers, transversely to the direction of conveyance of said articles of clothing through the tunnel, characterized by:

(a) a first non-treatment chamber (14) preceding the tunnel (11), a continuously open inlet opening (16) of the first non-treatment chamber extending perpendicularly relative to a continuously open outlet opening (17) thereof, the inlet opening (16) of the first non-treatment chamber (14) being relatively narrow to accommodate for longitudinal transportation of the articles of clothing therethrough, and the outlet opening (17) being relatively wide to accommodate for cross transportation of the articles of clothing (10) therethrough.

(b) a second non-treatment chamber (15) following the tunnel (11), a continuously open inlet opening (18) of the second non-treatment chamber extending perpendicularly to a continuously open outlet opening (19) of the second non-treatment chamber, the inlet opening (18) of the second non-treatment chamber being relatively wide to accommodate for cross transportation of the articles of clothing therethrough and the outlet opening (19) thereof being relatively narrow to accommodate for longitudinal transportation of the articles of clothing (10) therethrough, (c) first and second conveyance means (21, 23) for the transportation of the individual articles of clothing (10) through the first and second non-treatment chambers (14, 15), respectively and (d) a hot air channel (20) in an area of the inlet opening of the tunnel (11) for, together with the first non-treatment chamber (14), preventing the escape of steam, hot air and the like from the tunnel.

* * * * *